Feb. 24, 1959  F. W. TROESTER  2,875,105
INKS FOR MARKING CONDENSATION POLYMERS
Filed Sept. 15, 1955

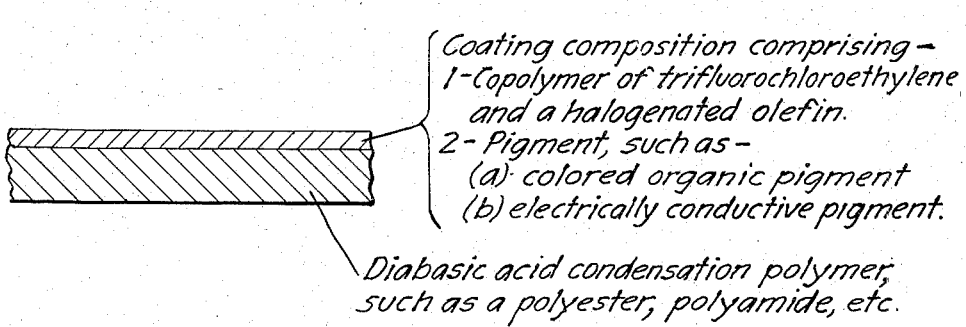

Coating composition comprising—
1—Copolymer of trifluorochloroethylene and a halogenated olefin.
2—Pigment, such as—
 (a) colored organic pigment
 (b) electrically conductive pigment.

Diabasic acid condensation polymer, such as a polyester, polyamide, etc.

INVENTOR
FRED W. TROESTER
BY
Carpenter, Abbott, Coulter & Kinney
ATTORNEYS

United States Patent Office

2,875,105
Patented Feb. 24, 1959

2,875,105

INKS FOR MARKING CONDENSATION POLYMERS

Fred W. Troester, La Crescenta, Calif., assignor, by mesne assignments, to Minnesota Mining and Manufacturing Company, St. Paul, Minn., a corporation of Delaware Application September 15, 1955, Serial No. 534,619

9 Claims. (Cl. 117—218)

This invention relates to an ink for marking film-forming diacid condensation polymers. In one of its more particular objects this invention relates to an ink composition which employs halogenated thermoplastic polymers as a pigment binder. In one of its additional aspects this invention relates to the use of trifluorochloroethylene polymer based inks in the marking of polyesters and polyamides.

Because of their excellent physical properties, and particularly their electrical properties, polymers obtained by condensing dicarboxylic acids are widely used in electrical applications. Among the more widely used of the condensation polymers are the polyamides, such as nylon and the polyesters, such as Mylar. Nylon finds particular application in the insulation of multi-stranded wire, while Mylar is widely used in film-form, and frequently as a base for printed electrical circuits.

In many of the applications in which these condensation polymers are employed, it is desirable and frequently necessary that an ink be applied to the surface of the polymer. Thus, in electrical insulation applications where the polymer is used to insulate individual conductors in a multi-conductor cable, some method of color coding must be employed. In addition, in printing electrical circuits on the surface of these condensation polymers, an adherent conductive ink is necessary. Aside from these necessary requirements, manufacturers frequently desire to apply their trademarks and other indicia to their products. Although there is available today a wide variety of inks, none has been found which will satisfactorily mark the orientable diacid condensation polymers. Some ink formulations smudge on contact with the polymer, while others chip or off-set after application.

It is an object of this invention to provide an ink composition which can be applied to diacid condensation polymers, such as the polyesters and the polyamides.

It is another object of this invention to provide a resin based ink which will adhere to the condensation polymer.

It is another object of this invention provide a process for color coding polyester and polyamide insulated wire.

It is another object of this invention to provide a process for printing electrical circuits on polyesters and polyamides.

Various other objects and advantages will become apparent to those skilled in the art on reading the accompanying description and disclosure in connection with the drawing, which is a diagrammatic cross-sectional view of a dibasic acid condensation product coated with the ink composition of this invention.

In general, the above objects are accomplished by applying to the surface that is to be marked, an ink which comprises a pigment admixed with a solution of a copolymer of trifluorochloroethylene in an oxygenated organic solvent.

The copolymers of trifluorochloroethylene which are used as pigment binders in the inks of this invention are normally solid, have softening points above about 150° C. and are soluble in oxygenated organic solvents. This group contemplates trifluorochloroethylene copolymerized with halogenated olefins such as vinyl chloride, vinylidene chloride, vinyl fluoride, vinylidene fluoride, 1,1-fluorochloroethylene and trifluoroethylene. A particularly suitable binder is a copolymer of trifluorochloroethylene and vinylidene fluoride wherein trifluorochloroethylene is present in an amount between about 5 and about 95 mole percent. Preferably, the trifluorochloroethylene-vinylidene fluoride copolymers contain trifluorochloroethylene in an amount between about 20 and about 80 mole percent. Of course, the characteristics of the binder are dependent upon the mole concentration of trifluorochloroethylene. Thus, if between about 20 and about 69 mole percent of trifluorochloroethylene, preferably about 50 mole percent, is present, the binder will have properties characteristic of elastomeric materials, whereas if between above about 69 and below about 80 mole percent of trifluorochloroethylene, preferably about 75 mole percent, is present, the binder will have the characteristics of a resinous material. In most applications, the preferred pigment binder is that which has resinous properties, that is a copolymer containing trifluorochloroethylene in an amount between above about 69 and below about 80 mole percent.

Since the process of this invention relates to new and novel ink compositions, their preparation and use, unnecessarily detailed description of the methods of preparation of the binder is not warranted. Therefore, only methods of preparation of the preferred resinous and elastomeric binders are given although by employing substantially identical polymerization systems but with different monomer feed ratios and polymerization times any copolymer in the range contemplated by this invention can be prepared.

The preferred resinous binder can be prepared by the procedure given below using the following water-suspension type recipe.

| | Parts by weight |
|---|---|
| Water, distilled | 200 |
| $CF_2=CFCl$ | 92.2 } 86/14 molar |
| $CF_2=CH_2$ | 7.8 |
| $(NH_4)_2S_2O_8$ | 2.0 |
| $Na_2S_2O_5$ | 0.8 |
| $FeSO_4 \cdot 7H_2O$ | 0.2 |

Catalyst and activator solution was prepared by dissolving 2 parts of $(NH_4)_2S_2O_8$ in 20 parts of water. Next, 0.8 part of $Na_2S_2O_5$ was dissolved in another 20 parts of water. In still another 20 parts of water, 9.2 parts of $FeSO_4 \cdot 7H_2O$ was dissolved. 140 parts of water were next charged to a silver-lined steel bomb. The aforementioned $(NH_4)_2S_2O_8$, $Na_2S_2O_5$, and the $FeSO_4 \cdot 7H_2O$ solutions were then added in succession. The contents of the bomb were frozen after each addition. The bomb was then closed and evacuated. Thereafter, 92.2 parts of $CF_2=CFCl$ and 7.8 parts of $CF_2=CH_2$ were flash-distilled into it. The bomb was then rocked at 20° C. over a period of 18 hours. The residual monomer was then vented from the bomb and a mixture of water and particles of resinous polymer were discharged. These particles were washed with hot water to remove residual salts, and were then dried in vacuo at room temperature. The mol percent of $CF_2=CFCl$ combined in the resulting copolymeric product was 75 percent.

The preferred elastomeric binder may be prepared using the following water-suspension type recipe.

| | Parts by weight |
|---|---|
| Water, distilled | 200 |
| $CF_2=CFCl$ | 64.5 } 50/50 molar |
| $CF_2=CH_2$ | 35.5 |
| $K_2S_2O_8$ | 1.0 |
| $Na_2S_2O_5$ | 0.4 |
| $FeSO_4 \cdot 7H_2O$ | 0.1 |

Catalyst and activator solution was prepared by dissolving 1 part of $K_2S_2O_8$ in 20 parts of water. In still another 20 parts of water, 0.1 part of $FeSO_4 \cdot 7H_2O$ was dissolved. 140 parts of water were next charged to a silver-lined steel bomb. The aforementioned $K_2S_2O_8$, $Na_2S_2O_5$, and the $FeSO_4 \cdot 7H_2O$ solutions were then added in succession. The contents of the bomb were frozen after each addition. The bomb was then closed and evacuated. Thereafter, 64.5 parts of $CF_2=CFCl$ and 35.5 parts of $CF_2=CH_2$ were flash-distilled into it. The bomb was then rocked at room temperature (between about 25° C. and about 35° C.) for a period of 24 hours. The residual monomer was then vented from the bomb and a mixture of water and chunks of rubbery polymer were discharged. These chunks were washed with hot water to remove residual salts, and were then dried in vacuo at room temperature. The mol percent of $CF_2=CFCl$ combined in the resulting copolymeric product was 49 percent.

The above described copolymers are used as binders in the inks of this invention. The binder is blended or admixed with any suitable pigment depending on the desired type of ink mark. The term pigment as used herein, includes the colored organic pigments, such as the dyes and lakes and the electrically conductive pigments, such as silver, carbon, graphite, mica, etc. The pigment can be soluble or insoluble in the binder and if insoluble, it is preferably finely-divided and intimately dispersed within the binder. Generally, insoluble pigments are preferred, since they are opaque, do not bleed and are more heat stable than the soluble pigments. In the preparation of inks which are used for color coding, or for the application of trademarks and other indicia, any colored pigment can be used, although usually organic compounds are preferred over the inorganic compounds because their colors are more intense and therefore less is required. Illustrative of the pigments which can be employed are the various phthalocyanine, azo, anthraquinone, benzidine, and pyrazolone compounds and their derivatives. A list of particularly suitable pigments is presented in the table below, but it is to be clearly understood that this list is representative and not unnecessarily limiting. These pigments are substantially insoluble in the solvent and in the binder.

Representative of the soluble pigments which can be employed in preparing colored inks, are the various indigo dyes, such as Ciba Yellow 3G, Brilliant Indigo 4B, Ciba Green G, Ciba Violet A, Helidon Orange R, etc., the alizarine dyes such as Alizarine Cyanine Green, Alizarine Blue, Alizarine Orange and the quinoline dyes such as Chinoline Yellow. These dyes are described and methods of preparation are given in Organic Chemistry, Fieser and Fieser, second edition, pages 907, 910–912, and 916–918.

In preparing electrically conductive inks any electrical conductor can be employed. A variety of materials varying in their conductive properties are suitable, e. g., good conductors, such as silver, copper, aluminum, etc., and poor conductors, such as amorphous carbon, graphite, etc. Extremely poor conductors, such as mica and clay are used to alter the conductive properties of the other conductors. The conductive pigments which are incorporated in the copolymeric binder should be in finely and uniformly-divided form. The average particle size of this material should not exceed 10 microns, and preferably should be between about 5 and about 0.01 micron. Particle size should be as small as can possibly be obtained since small particle size favors the efficient functioning of the circuit, e. g., by reducing noise level.

In employing the inks of this invention, the binder is preferably dissolved in a solvent. Suitable solvents or thinners are the oxygenated organic solvents in some of which the binder is completely soluble, while in others it is partially soluble. Thus, the binder is completely soluble in tetrahydrofuran, tetrahydro-2-methyl furan, tetrahydropyran, 3-chlorotetrahydrofuran and dioxane. Among the solvents in which the binder is partially soluble are ethyl acetate, isobutyl propionate, amyl acetate, methyl ethyl ketone, isophorone, di-isobutyl ketone, cyclohexanone, mesityl oxide, 1-chloro 1-nitroethane and 2-chloro 2-nitropropane. These latter solvents when mixed with a solvent in which the binder is completely soluble will form a solvent mixture which will completely dissolve the binder. The use of solvent mixtures is desirable in order to control drying rate. A particularly suitable solvent is tetrahydrofuran; a particularly suitable mixture is tetrahydrofuran and dioxane. Pref- Table

| | Common Name [1] | Reference to Structure [1] | Chemical Name | General Structure |
|---|---|---|---|---|
| (1) | Phthalocyanine Blue | Karrer's Organic Chemistry, pp. 788–789, 4th edition. | Copper-pthalocyanine | Phthalocyanine pigment. |
| (2) | Phthalocyanine Green | do | Chlorinated Copper-phthalocyanine | Do. |
| (3) | do | do | Highly chlorinated Copper-phthalocyanine | Do. |
| (4) | Benzidine Yellow Toner | Fig. 49, p. 391 | o-dichlorobenzidine bis alpha-(azo o-methyl alpha-acetoacetanilide). | Substituted Benzidine acetanilide azo pigment. |
| (5) | do | Fig. 48, p. 391 | o-dichlorobenzidine bis alpha-(azo alpha-acetoacetanilide). | Do. |
| (6) | do | Fig. 50, p. 392 | o-dichlorobenzidine bis alpha-(azo o,p-dimethyl-alpha-acetoacetanilide). | Do. |
| (7) | Dianisidine Orange Toner | Fig. 60, p. 397 | o-dianisidine bis alpha-(azo o-methyl-alpha acetoacetanilide). | Do. |
| (8) | do | Fig. 61, p. 397 | o-dianisidine bis alpha-(azo o,p-dimethyl alpha-acetoacetanilide). | Do. |
| (9) | do | Fig. 62, p. 398 | o-dianisidine bis alpha-(azo alpha-acetoacetanilide). | Do. |
| (10) | Lithosal Red 2-B | Fig. 91, p. 412 | Calcium salt of 2-hydroxy-3-carboxy-1-naphthyl azo ortho-(p-chloro-m-toluene sulfonic acid). | Phenyl-napththyl azo pigment. |
| (11) | Benzidine Orange Toner | Fig. 51, p. 392 | o-dichlorobenzidine bis 4-(azo-1-phenyl-3-methyl pyrazolone). | Substituted Benzidine-Pyrazolone azo pigment. |
| (12) | Vulcan Fast Red BA | Fig. 81, p. 407 | o-dichlorobenzidine bis 4-(azo-1-phenyl-3-ethyl carboxylate-pyrazolone). | Do. |
| (13) | Vulcan Fast Red G | Fig. 80, p. 407 | o-dianisidine bis 4-(azo-1-p-tolyl-3-methyl-pyrazolone). | Do. |
| (14) | Permanent Red F-4RH | Fig. 77, p. 405 | 1-(p-chloro-o-tolyl azo)-2-naphthol-3-amido-n-(p-chloro-o-methyl benzene). | Substituted phenyl-naphthyl-toluidine azo pigment. |
| (15) | Permanent Red F-4R | Fig. 76, p. 405 | Ring structure similar to that of pigment (14). | Do. |
| (16) | Chloronitroaniline Red Toner | Fig. 75, p. 404 | do | Do. |
| (17) | Nitroaniline Red Toner | Fig. 73, p. 403 | do | Do. |
| (18) | Toluidine Maroon Toner | Fig. 82, p. 408 | do | Do. |
| (19) | Nitroanisidine Maroon Toner | Fig. 84, p. 409 | do | Do. |
| (20) | Indanthrene Blue | Karrer's Organic Chemistry p. 401 4th edition. | N - N'- dihydro -1,2,1',2'- dianthraquinone phenazine. | Dianthraquinone dye. |
| (21) | Indanthrene Orange RRTA | Fig. 126 p. 430 | | Bromo-anthraquinone dye. |

[1] Unless otherwise indicated references to structure may be found in J. J. Mattiello, "Protective and Decorative Coatings," v. 5 chapter 4 (John Wiley and Sons 1946).

erably equal amounts by volume of each solvent constitute the mixture although the solvent in which the binder is completely soluble may constitute from about 25 percent to about 95 percent of the mixture.

In compounding the inks of this invention, the binder is preferably first dissolved in a suitable solvent such as tetrahydrofuran after which the pigment is admixed with the dissolved binder. Admixture of the pigment with the dissolved binder can be effected by using any of the conventional mixing and blending equipment, such as a three roll paint mill, colloid mill, and pebble mill, etc. The range of concentration of the various ingredients of the ink will vary over relatively wide limits depending upon the desired thickness of the ink mark, the intensity of color and the method by which the ink is to be applied. Generally, the ratio of binder to pigment will be between about 20:1 and about 1:2. Preferably, the ratio will be between about 10:1 and about 1:1 while a particularly suitable ratio is between about 4:1 and about 1:1. The solvent or thinner is used in an amount between about 25 percent and about 99 percent by weight, depending particularly on the process which is to be used in applying the ink. A particularly suitable concentration of solvent is between about 50 and about 95 percent. Obviously, a solvent is required where the marking process is based on the use of liquids. However, some marking processes are best suited to the use of solid marking composition for example, the hot stamp process. In this case a solvent free pigmented film from 1 to 5 mils thick can be used as the marking composition.

The linear orientable dibasic acid condensation polymers which are marked using the process of this invention, are prepared by the condensation of dibasic acids with di-functional organic compounds, such as dihydric alcohols and diamines. Representative diacids, include carbonic, oxalic, succinic, glutaric, adipic, pimelic, suberic acids, etc., or in general, the saturated aliphatic dicarboxylic acids having from 1 to 15 carbon atoms in the chain and the aromatic dicarboxylic acids, such as isomers of the phthalic acids. Reaction of the above described dibasic acids with a dihydric alcohol, such as ethylene glycol, propylene glycol, trimethylene glycol, hexamethylene glycol, or in general, with saturated aliphatic dihydric alcohols containing from 2 to 12 carbon atoms in the chain, produces a polyester. Reaction of the above described dibasic acids with diamines, such as ethylene diamine, trimethylene diamine, propylene diamine, pentamethylene diamine, or in general, saturated aliphatic diamines containing from 2 to 12 carbon atoms and with aromatic diamines, such as benzidine and phenylene diamine produces a polyamide. Within this group of dibasic condensation polymers is the preferred polyester prepared by condensing terephthalic acid with ethylene glycol. This polyester is commercially available as Mylar. The preferred polyamide is prepared by condensing adipic acid with hexamethylene diamine to produce the commercially available nylon. (Nylon type 10 also known as Zytel 101 and Zytel 105—the latter containing a small quantity of carbon black to increase weather resistance but otherwise being the same as Zytel 101.) Other types of nylon can be employed such as the hexamethylene diamine-sebacic acid condensation product which is known as nylon type 3 and also as Zytel 31 and Zytel 33. Zytel 33 is heat stabilized Zytel 31.

The ink compositions of this invention can be applied to the above described condensation polymers using a variety of marking techniques. Thus, the inks can be applied to the polymer surface using silk screen, stenciling, or stamping techniques. Where the ink is to be applied in the form of a color coding on insulated wire, e. g., nylon insulated wire, then suitable wire striping equipment such as the Entwhistle striper can be employed. Depending upon viscosity requirements of the particular marking process employed, thinners or thickeners can be added to the basic ink formula. In wire striping applications, inks of relatively low viscosity are preferable. Hence, the basic ink formula can be further diluted by the addition of solvents usually in an amount from one-half to one and one-half times by volume. Where inks of higher viscosity are required, as in silk screen and transfer printing processes, the viscosity of the ink can be increased by the addition of thickeners, such as bentonite, clay, silica, etc.

While the inks used in the process of this invention are basically air drying inks, maximum adhesion to the condensation polymer is obtained by force drying the ink. Where the ink is applied to the surface of a film or other molded article, then the drying can be carried out in an oven or other suitable equipment. Where the ink is applied as a color coding on insulated wire, force drying is preferably carried out by passing the striped wire from the striping machine to a heated tower. In either case, the heating cycle is preferably adjusted so as to maintain the inked surface at a temperature between 250° F. and about 500° F. for a period of time between about 1 second and about 30 minutes. In the case of striped wire, which is preferably dried in a tower, the drying is accomplished by passing the wire to a tower between about 5 and about 40' in height at a rate of between about 5 and about 100' per minute, while maintaining a temperature in the tower between about 250 and about 500° F. Preferably, a tower between about 20 and about 30' in height, between about 12" to about 15" in diameter, maintained at a temperature between about 275° F. and about 475° F. is employed in conjunction with a wire speed of about 50–95' per minute. The tower can be rectangular, square or circular in shape.

In order to illustrate the process of this invention, the following examples illustrating the striping of nylon and Mylar polymers are presented. The inks employed are prepared by admixing the indicated pigment in a resin solution in a pebble mill. In each case, the resin (binder) is a 75/25 copolymer of trifluorochloroethylene and vinylidene fluoride.

*Example I*

Nylon (type 10) insulated multi-stranded copper wire (AWG 22) is fed to an Entwhistle striping machine. The ink cups on the machine contain a red ink. The red ink is prepared by blending approximately 18 parts of the trifluorochloroethylenevinylidene fluoride copolymer (75/25 mole ratio), 6 parts of Vulcan Fast Red G, 60 parts of tetrahydrofuran and 16 parts of dioxane. As the nylon insulated wire passes through the Entwhistle machine, a series of red stripes is affixed thereto. The wire is then passed through a heating tower approximately 15" in diameter and approximately 30' in height, which is heated by block-type heat coils spotted on the inside of the tower approximately 14" above the wire stripping machine. The temperature in the heating tower is maintained at approximately 275° F. The wire is passed through the tower at a speed approximately 75' per minute. The striped wire is then allowed to age for approximately 4 days after which a firmly bonded ink mark is obtained on the nylon insulated wire.

*Example II*

Nylon (type 10) insulated wire as used in Example I is fed to an Entwhistle wire striper which is adapted to provide 3 different colored stripes to the wire, i. e. each of the three cups on the wire striper contains a different colored ink. Each of the inks contained approximately 10 parts of the trifluorochloroethylene-vinylidene fluoride copolymer (75/25 mole ratio) two and one-half parts of colored pigment, 62½ parts of tetrahydrofuran and 25 parts of dioxane. A green ink using phthalocyanine green, a blue ink using phthalocyanine blue, and a red ink using Vulcan Fast Red G, are employed. As the striped nylon insulated wire leaves the wire striper it is passed through a tower as described in Example I. A nylon insulated wire color-coded with alternating red, green and blue striper is obtained. The ink stripe is firmly bonded to the nylon.

*Example III*

The process of Example I is repeated, except that the ink contained nitroanisidine maroon toner. A nylon insulated wire having a maroon striping is obtained. The striping is permanently bonded to the nylon substrate.

*Example IV*

A number of inks having colors which conform to MIL standard 104, are prepared by blending various pigments and adding the blended pigment to the copolymeric binder and solvent. The copolymeric binder, in this case, is a copolymer of trifluorochloroethylene and vinylidene fluoride (75/25 mole ratio). A violet ink is prepared by blending phthalocyanine blue, pyrazolone red, and titanium dioxide so as to match the violet color on the standard scale. 5.5 parts of the violet pigment is blended in a pebble mill with 15.4 parts of copolymeric binder and 79.1 parts of tetrahydrofuran-dioxane solvent in a 2:1 ratio. Benzidine yellow and phthalocyanine green are blended to match the green color standard. Phthalocyanine green, benzidine yellow and electra red are blended to match the brown color standard. A green and brown ink respectively, are prepared by blending 3.1 parts of each of the above described colors with 11½ parts of copolymeric binder and 85.4 parts of tetrahydrofuran-dioxane solvent (2:1 ratio). A black ink is prepared by blending 1 part of carbon black with 19 parts of copolymeric binder and 80 parts of tetrahydrofuran-dioxane solvent (2:1 ratio). A white ink is prepared by blending 7.5 parts of titanium dioxide with 18.6 parts of copolymeric binder and 73.9 parts of tetrahydrofuran-dioxane solvent (2:1 ratio). A gray ink is prepared by blending titanium dioxide and carbon black so as to conform to the gray color standard. Approximately 6.5 parts of the blend is added to 17.3 parts of copolymeric binder and 76.2 parts of tetrahydrofuran-dioxane solvent.

Each of the above inks is applied as a single color on nylon insulated multi-stranded wire (AWG 18) using an Entwhistle machine. Multi-striped nylon insulated wire is prepared by filling each of the cups of an Entwhistle machine with a different colored ink. In each case, the striped wire is passed through a heating tower and is heated as described in Example I. In each case, the ink stripes are firmly bonded to the nylon insulation.

The above described inks in conjunction with the inks previously described, give a range of colors which can be used to color-code nylon insulated wire using the color-coding system of MIL standard 104 or the National Electrical code.

*Example V*

A film of Mylar (polyethylene terephthalate) obtained by condensing ethylene glycol with terephthalic acid is marked by a stamping technique (rubber stamp) with an ink containing approximately 20 parts of trifluorochloroethylene-vinylidene fluoride copolymer, 5 parts of phthalocyanine green, 50 parts of tetrahydrofuran, and 25 parts of dioxane. The marked film is heated at about 275° F. in an oven for about 1 hour. The ink mark is firmly bonded to the Mylar substrate.

*Example VI*

Each of the inks described in Example IV, is applied by a stamping technique to a film of Mylar. The stamped film is then heated at about 275° F. for about one hour. Each of the ink marks is firmly bonded to the Mylar substrate.

*Example VII*

A Mylar film is painted with an electrically conductive ink containing approximately 10 parts of trifluorochloroethylene-vinylidene fluoride copolymer, 10 parts of micro-fine carbon, and 80 parts of tetrahydrofuran. The ink is applied in the form of strips approximately 4" in length and 1/16" in width. The resistance of the strip is approximately $1 \times 10^5$ megohms.

*Example VIII*

A film of Mylar is marked with an electrically conductive ink similar to the ink described in Example V, except that 10 parts of micro-fine silver are used in place of the micro-fine carbon. The ink is applied in 4" lengths approximately 1/16" in width. Voltage breakdown tests are excellent.

Various modifications and alterations of the process of this invention will be apparent to those skilled in the art and may be used without departing from the scope of this invention.

Having thus described my invention, I claim:

1. A solid dibasic acid condensation polymer coated with an indicia containing a copolymer of trifluorochloroethylene and a hydrogen-containing halogenated olefin and a pigment.

2. A solid polyamide surface coated with an indicia containing a copolymer of trifluorochloroethylene and vinylidene fluoride and an insoluble organic pigment.

3. A solid polyamide surface coated with an indicia containing a copolymer of trifluorochloroethylene and vinylidene fluoride and an electrically conductive pigment.

4. A solid polyhexamethylene adipamide surface which is marked with a marking composition comprising a pigment and a copolymer containing between about 20 and about 80 mole percent of trifluorochloroethylene copolymerized with vinylidene fluoride.

5. A color coated conductor comprising a metallic conductor, an insulating layer of a polyamide, the outer surface of said solid polyamide being striped with an ink which comprises an insoluble organic pigment and a copolymer containing between about 20 and about 80 mole percent of trifluorochloroethylene copolymerized with vinylidene fluoride.

6. A solid polyester condensation polymer coated with an indicia containing a copolymer of trifluorochloroethylene and a hydrogen-containing halogenated olefin and a pigment.

7. A solid polyester surface coated with an indicia containing a copolymer of trifluorochloroethylene and vinylidene fluoride and an insoluble organic pigment.

8. A solid polyester surface coated with an indicia containing a copolymer of trifluorochloroethylene and vinylidene fluoride and an electrically conductive pigment.

9. A solid polyethylene terephthalate surface which is marked with a marking composition comprising a pigment and a copolymer containing between about 20 and about 80 mole percent of trifluorochloroethylene copolymerized with vinylidene fluoride.

References Cited in the file of this patent

UNITED STATES PATENTS

| | | |
|---|---|---|
| 2,279,771 | Austin | Apr. 14, 1942 |
| 2,476,737 | Kern et al. | July 19, 1949 |
| 2,659,153 | Beeber | Nov. 17, 1953 |
| 2,715,591 | Graham et al. | Aug. 16, 1955 |
| 2,730,466 | Daszewski | Jan. 10, 1956 |
| 2,738,343 | Dittman et al. | Mar. 13, 1956 |
| 2,752,332 | Honn | June 26, 1956 |
| 2,766,136 | Gray | Oct. 9, 1956 |
| 2,790,736 | McLaughlin et al. | Apr. 30, 1957 |

UNITED STATES PATENT OFFICE

CERTIFICATE OF CORRECTION

Patent No. 2,875,105 February 24, 1959

Fred W. Troester

It is hereby certified that error appears in the printed specification of the above numbered patent requiring correction and that the said Letters Patent should read as corrected below.

Column 1, line 51, before "provide" insert -- to --; column 6, line 55, for "stripping" read -- striping --.

Signed and sealed this 25th day of August 1959.

(SEAL)
Attest:

KARL H. AXLINE
Attesting Officer

ROBERT C. WATSON
Commissioner of Patents